Patented Nov. 6, 1928.

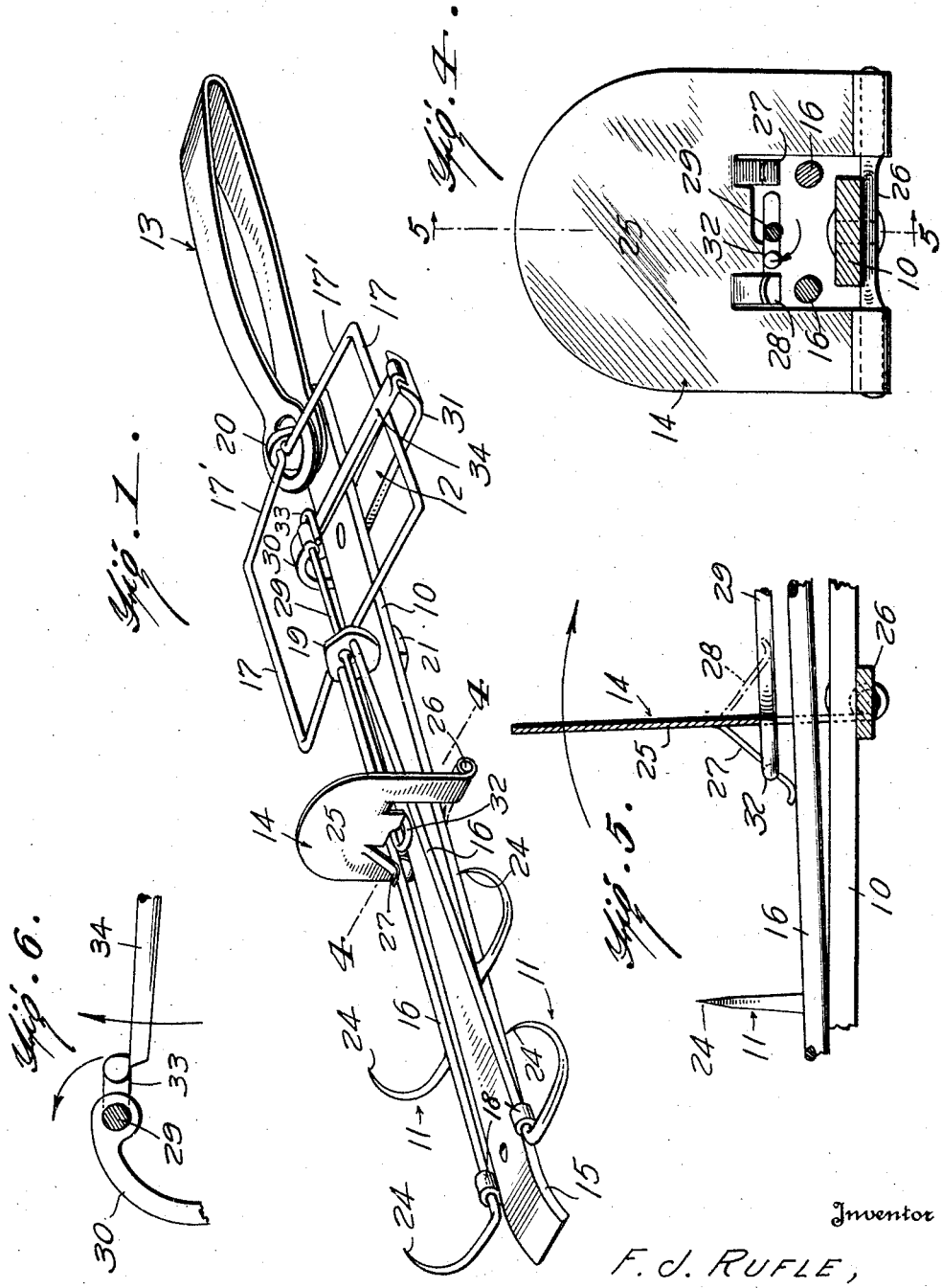

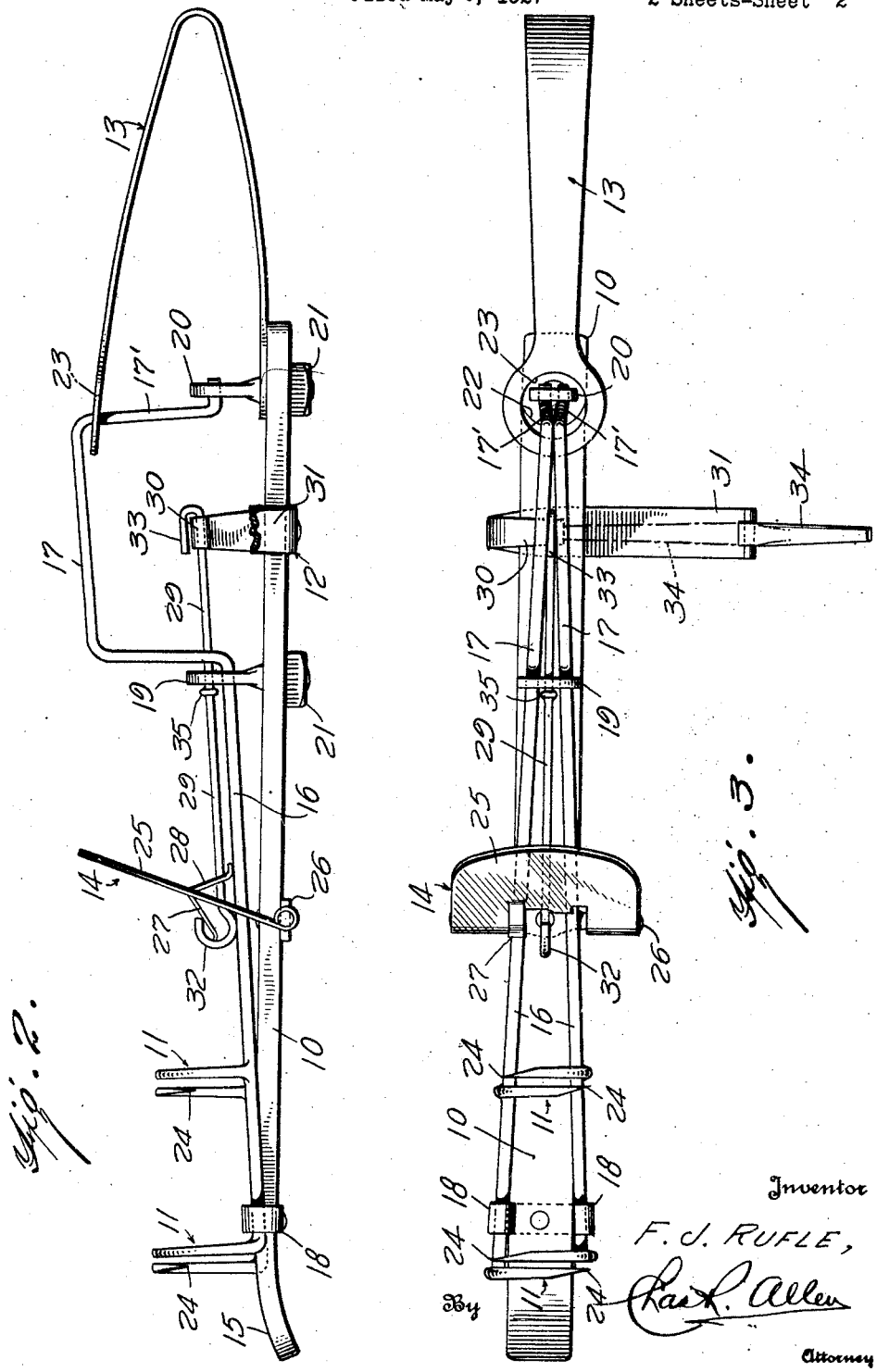

1,690,755

UNITED STATES PATENT OFFICE.

FRED J. RUFLE, OF LANDER COUNTY, NEVADA.

ANIMAL TRAP.

Application filed May 9, 1927. Serial No. 190,007.

My invention relates to animal traps in general and has particular reference to a device for catching moles, gophers, prairie dogs, or the like and among other advantages consists in a trap that may be readily set with the foot to prevent the animal from picking up any scent of the hands. It is so constructed as to render its being easily placed within the hole or burrow in its set position permitting the animal to readily pass through it, and may be easily set off, locked by assured action which will effectually grip and pierce the animal. The trap in its entirety being composed of but a relatively few number of parts as to render its reuse a maximum number of times. The scope of my invention extends to whatever constructions may be defined by or included within the terms or language of the appended claims.

In the drawings:

Figure 1 is a view in perspective illustrating my trap in its set position.

Figure 2 is a side elevation thereof showing the trap in its sprung position;

Figure 3 is a top plan view thereof;

Figure 4 is a transverse sectional view taken on the line 4—4 of Figure 1;

Figure 5 is a detailed sectional view taken on line 5—5 of Figure 4, and

Figure 6 is a detailed sectional view more clearly illustrating the trigger member.

My invention in the form or embodiment shown in the drawing and briefly described, comprises a longitudinally extending bar 10, on which is mounted the jaws indicated generally as at 11, the trigger mechanism shown as at 12, a flat spring for locking the device indicated as at, 13, and a setting off mechanism, 14, all of which being supported upon the bar, 10. The forward end of the longitudinally extending bar, 10, is curved downwardly as at, 15, for the purpose of readily seating this portion of the trap in the ground so that the animal in entering will not come in contact with any abrupt edges.

The pivotally mounted rods, 16, have formed thereon the jaws, 11, at their forward ends and the substantially large loops, 17, at their rear ends, and are pivotally mounted in the strap, 18, which is riveted to the forward end of the bar, 10, and to the upwardly extended ears, 19 and 20, located near the rear of the bar. As shown in Figure 2 the ears, 19 and 20, may be secured to the base or bar, 10, by the nuts, 21.

The pivotally mounted rods, 16, are preferably inclined forwardly as shown in Figure 2 so as to locate the jaws, 11, as close to the ground or the bottom of the hole or furrow as possible and at the same time permit ample movement or space for the flat spring, 13, at their rear ends. The rods, 16, it will be noted, are pivoted on either side of the bar, 10, at their forward ends whereas the other pivotal ends at their rear are relatively close so as to enable the rear ends, 17', of the loops, 17, to readily pass through the opening, 23, of the upper leaf of the spring, 13.

In this manner the spring, 13, is provided on its lower leaf with an opening, 22, which is located around the lug, 20, whereas the hinge or flared end, 23, of the upper leaf is provided with an opening of a suitable size so as to permit it to pass over the lug, 20, together with the adjacent portions of the loops, 17'. The loops, 17, being integrally formed with the rods which support the jaws, 11, renders the trap to be firmly locked when sprung and relatively immovable when set. It will be noted that the points, 24, of the jaws, 11, overlap each other as shown in Figure 3 when the trap is sprung in what might be termed a shearing action. This construction it will be readily seen provides an excellent means for effectively holding the animal after the trap has been sprung.

The novel manner of trigger and locking mechanism associated with this invention consists of the pivotally mounted latch plate, 14, which is carried on the outer ends of the transversely extending strip, 26, which is in turn suitably riveted to the under side of the bar, 10. This latch plate is preferably located approximately midway between the jaws and the loops, 17, so as to be easily operated by the soil which the animal pushes ahead of it during its passage through the hole or burrow. For the purpose of limiting the pivotal movement of the latch plate, 25, I provide a pair of integrally formed and oppositely projecting ends which are preferably constructed up from this plate. These oppositely projecting ends, 27 and 28, are adapted to bear against either of the rods, 16, as clearly shown in Figures 2 and 5.

The trigger rod, 29, is pivotally mounted through the lug or ear, 19, and the upstanding portion 30, of the strip, 31. The strip, 31, is of course carried by the bar, 10, and preferably riveted thereto or secured in any other manner. The rod, 29, is formed on its forward end with a loop, 32, which is adapted for engagement with the latch plate, 25, and also provided on its rear end with a backwardly bent portion, 33, and adapted for engagement with the latch piece, 34. To prevent the displacement of the rod, 29, I locate an enlarged head or collar, 35, adjacent to the ear, 19, as shown in Figures 2 and 3.

The strip, 31, for supporting one end of the rod, 29, is provided with an outwardly extending end and forwardly curved portion for pivotally mounting the latch plate, 34, so that it will freely rotate thereon.

In setting my improved trap with the minimum amount of manipulation by human hands I have found it desirable to depress the spring, 13, with the foot which permits the jaws and the loops to open. It is then but necessary to throw the latch piece, 34, over the adjacent loop, 17, swing the rod, 29, until the backwardly bent portion, 33, will be seated against the tip of the latch piece, 34, or as indicated in Figure 6, and then to swing the latch plate, 25, over the hooked end, 32, as clearly shown in Figure 5 when the pressure of the foot may be released. The flat spring, 13, may of course act as a handle in the placing of the trap in its proper position within the hole.

What I claim is:

1. A device of the character described comprising a longitudinally extending bar provided with ears on its forward end and a pair of forwardly extending lugs on the rear end thereof, a pair of downwardly and diverging rods having jaws on their forward ends and relatively large loop portions on the rear ends thereof said rods being pivotally mounted in the ears and lugs carried by said longitudinally extending bar, a pivotally mounted rod located intermediate said rods for carrying the jaws and provided with a loop portion on its forward end a backwardly bent portion on the rear end thereof, a pivotally mounted latch piece adapted for engagement with said backwardly bent end, a swinging latch plate arranged to cooperate with said hook end, and a spring located adjacent to said loop ends, normally tending to close the jaws.

2. An animal trap comprising a longitudinally extending bar, a pair of longitudinally extending oppositely disposed rods having jaw portions and formed at one end with spring engaging loops, said rods being pivoted on said bar, a spring at one end of said bar for compressing said loops to rotate said rods for actuation of the jaw portions when the trap is sprung, a transverse bar carried by said longitudinal bar beneath said looped portions, a keeper hinged at one end of said transverse bar to overlie one of said looped portions, a trigger member extending longitudinally in said trap and adapted to engage over and retain the inner end of said keeper when the trap is in said position, and a latch member pivoted on said longitudinal bar for movement over said trigger whereby to release the same and spring the trap.

FRED J. RUFLE.